United States Patent Office 3,470,248
Patented Sept. 30, 1969

---

3,470,248
TRICYCLIC POLYAMINES
Thomas K. Brotherton, Charleston, Robert J. Knopf, St. Albans, and Paul S. Starcher and Charles A. Noffsinger, Charleston, W. Va., assignors to Union Carbide Corporation, a corporation of New York
No Drawing. Filed Oct. 19, 1965, Ser. No. 498,091
Int. Cl. C07c *87/40, 87/00;* C07d *21/00*
U.S. Cl. 260—563    7 Claims

ABSTRACT OF THE DISCLOSURE

Tricyclic polyamines and polyisocyanates which include decahydro-1,4-methanonaphthalene - 2,5 - ylenedialkylene diamines and diisocyanates, dodecahydro-1,4-methanobenzocyclooctane-2,7(or 8)-ylenedialkylene diamines and diisocyanates, tricyclo[4.2.1.0$^{2,5}$]non-3,7(or 8)-ylenedialkylene diamines and diisocyanates, and hexahydro-4,7-methanoindan-1(or 2), 5(or 6)-ylenedialkylene diamines and diisocyanates are useful in the resin arts such as in the preparation of urethane polymers, polyamides and polyurethane polyurea elastomers.

---

The invention relates to tricyclic compositions and to various polymeric derivatives thereof. In one aspect, the invention relates to tricyclic polyamines and to various polymeric derivatives thereof. In another aspect, the invention relates to tricyclic polyisocyanates and to various polymeric derivatives thereof.

The tricyclic compositions of the invention are polyamino- or polyisocyanato-substituted tricyclic compounds. Among the tricyclic compositions that are within the scope of the invention are those that are represented by Formula I:

(I)
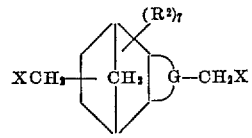

wherein X represents isocyanato (—NCO) or amino (—NH$_2$); wherein R represents a saturated organic group of up to 20 carbon atoms and which can be unsubstituted or which can be substituted with ether oxygen (—O—, oxycarbonyl $$-O\overset{O}{\underset{\|}{C}}-$$

thio (—S—), sulfone (—SO$_2$—), aminoalkyl, or isocyanatoalkyl; wherein Y represents methylene, ethylene, ethylidene, alkoxy-substituted derivatives thereof, or oxy; wherein R$^2$ represents hydrogen, alkyl, alkoxy, aminoalkyl, or isocyanatoalkyl; and wherein G represents a saturated hydrocarbon group that can be unsubstituted or that can be substituted with alkyl, alkoxy, oxy, aminoalkyl, or isocyanatoalkyl, and which, together with the two carbon atoms to which >G—RX is bonded, forms a cycloaliphatic ring of from 4 to 8 carbon atoms in the ring. A second class of tricyclic compositions that are within the invention are compounds that have three fused saturated hydrocarbon rings, the said rings individually having from 4 to 8 carbon atoms provided that at least one of said rings has 6 carbon atoms, and wherein said compounds each contain at least two isocyanato or at least two amino groups.

One highly desirable class of tricyclic compositions that are within the scope of the invention are the poly-amines and polyisocyanates that are represented by Formula II:

(II)
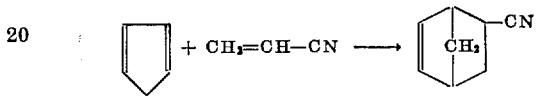

wherein X, R$^2$, and G have the meanings described above with respect to Formula I. Among the various compounds that are represented by Formula II are the following:

Decahydro - 8 - methyl - 1,4 - methanonaphthalen-2,5-ylenedimethylene diisocyanate and diamine which can be produced by the following sequence of reactions:

(1) Cyclopentadiene plus acrylonitrile to form 5-norbornene-2-carbonitrile

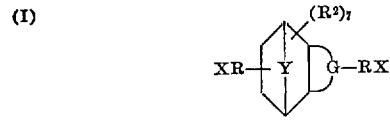

(2) 5-norbornene-2-carbonitrile plus sorbaldehyde (2,4-hexadienal) to form 2(or 3)-cyano-1,2,3,4,4a,5,8,8a-octahydro - 8 - methyl - 1,4 - methanonaphthalene-5-carboxaldehyde (I)

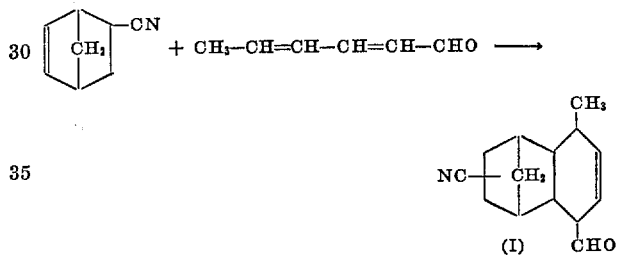

(3) (I) plus ammonia and hydrogen to form decahydro-8 - methyl - 1,4 - methanonaphthalen - 2(or 3),5-ylenedimethylene diamine (II)

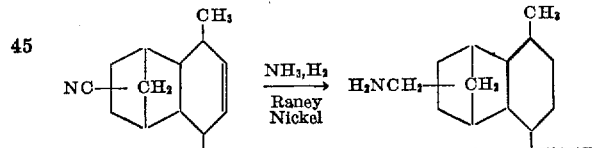

(4) (II) plus phosgene to form decahydro-8-methyl-1,4-methanonaphthalen - 2(or 3),5-ylenedimethylene diisocyanate (III)

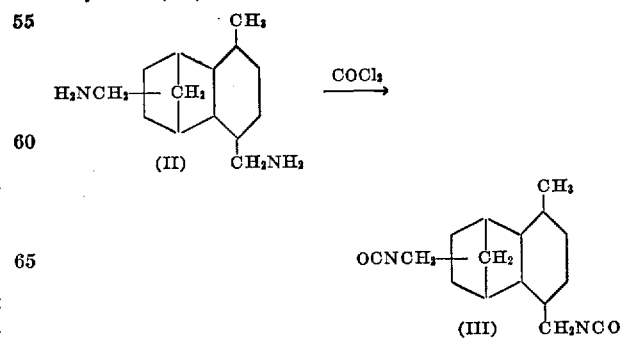

Reaction (1), above, is a conventional Diels-Alder reaction between cyclopentadiene and a dienophile. Diels-Alder reactions are well known in the art, for instance, see Organic Reactions, volume IV, edited by Roger Adams et al., John Wiley & Sons, Inc., New York, pages 60–173, particularly, pages 89–92. Reaction (2), above, is also a conventional Diels-Alder reaction. Reaction (3) above, is a combined hydrogenation and reductive alkylation (or reductive amination). The hydrogenation saturates the ethylenic double bond and converts the nitrile group. Both types of reactions are well known in the tion converts the aldehyde group to an aminomethyl group. Both types of reaction are well known in the art. For instance, reductive alkylation (or amination) is discussed in Organic Reactions, volume IV, pages 175 et seq. Reaction (4), above, is a conventional phosgenation reaction to form an isocyanate from a primary amine. Phosgenation reactions are well known in the art, for instance, such reactions are described in U.S. Patents Nos. 2,680,127; 3,128,310 and 3,155,699; French Patent No. 1,368,031 and in an article by Siefken, Annalen Der Chemie, 562, pages 75–136 (1949).

Also illustrative of the compounds that are represented by Formula II are dodecahydro-1,4-methanobenzocyclooctane-2,7(or 8)-ylenedimethylene diamine or diisocyanate which can be produced by the following sequence of reactions:

(1) Diels-Alder reaction or cyclopentadiene with 1,5-cyclooctadiene to produce 1,4,4a,5,6,9,10,10a-octahydro-1,4-methanobenzocyclooctene (IV)

(2) Reaction of (IV) with carbon monoxide and hydrogen to form dodecahydro-1,4-methanobenzocyclooctene-2,7(or 8)-dicarboxaldehyde (V).

(3) Reductive amination of (V) to form dodecahydro-1,4-methanobenzocyclooctane-2,7(or 8)-ylenedimethylene diamine (VI)

(4) Phosgenation of (VI) to form the diisocyanate (VII)

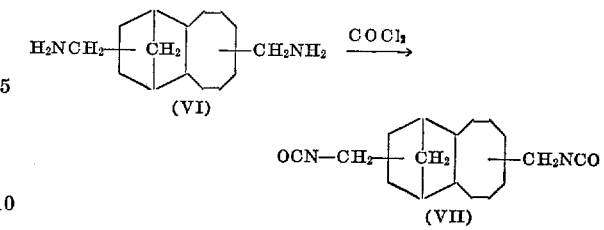

Reaction (3), above, is a conventional oxo reaction between an olefin, carbon monoxide, and hydrogen to form an aldehyde. The oxo reaction is well known in the art as is illustrated by the article appearing in Encyclopedia of Chemical Technology, volume 9, pages 699 et seq. (Interscience Publishers, Inc., New York, N.Y.).

Formula II is also exemplified by decahydro-1,4-methano-1H-benzocyclohepten-2,6(7 or 8)-ylenedimethylene diamine (VIII) and diisocyanate (IX), prepared by a route analogous to that employed to produce (VI) and (VII), except that the starting reactants are cyclopentadiene and 1,4-cycloheptadiene.[1] The molecular structures of these compounds are:

Additional illustrations of the compounds that fall within the scope of Formula II are tricyclo[4.2.1.0^{2,5}]non-3,7(or 8)-ylenedimethylene diamine (X) and diisocyanate (XI). These compounds can be produced from cyclopentadiene and 3,4-dichlorocyclobutene by the following sequence of reactions:

(3) Reductive amination of (XIII) to yield the diamine (X) followed by phosgenation to produce the diisocyanate (XI). The molecular structures of these compounds are:

Another group of compounds that illustrate Formula II are hexahydro-4,7-methanoindan-1(or 2),5(or 6)-ylenedimethylene diamine (XIV) and diisocyanate (XV).

---

[1] Cope et al., J. Am. Chem. Soc. 84, 4862–5 (1962).

These compounds can be produced from dicyclopentadiene by the following sequence of reactions:

(1) 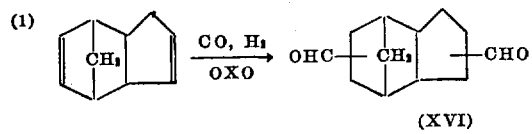

(2) Reductive amination of (XVI) yields the diamine (XIV) followed by phosgenation to produce the diisocyanate (XV). The molecular structures of these compounds are:

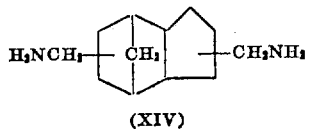

(XIV)

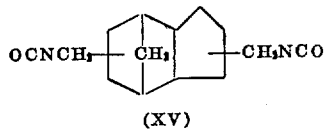

(XV)

A further group of compounds that are illustrative of Formula II are tricyclo[6.2.1.0$^{2,7}$]-undec-4(or 5),9(or 10)-ylenedimethylene diamine (XVII) and diisocyanate (XVIII). These compounds can be produced from cyclopentadiene, acrylonitrile, and butadiene by the following sequence of reactions:

(1)

(2)

(3)

(4) Reaction of the product of step (3) with ammonia and hydrogen produces the diamine (XVII), which is then reacted with phosgene to form the diisocyanate (XVIII). The molecular structures of these compounds are represented by the following formulas:

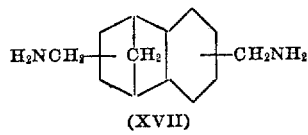

(XVII)

(XVIII)

A still further group of compounds that are illustrative of Formula II are 9-methyltricyclo[6.2.1.0$^{2,7}$]undec-4(or 5),10-ylenedimethylene diamine (XIX) and diisocyanate (XX). These compounds can be produced from cyclopentadiene, crotonaldehyde, and butadiene by a sequence of reactions analogous to those immediately above. The molecular structures of these compounds are represented by the formulas:

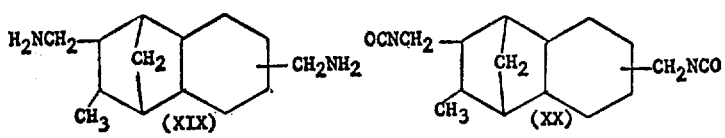

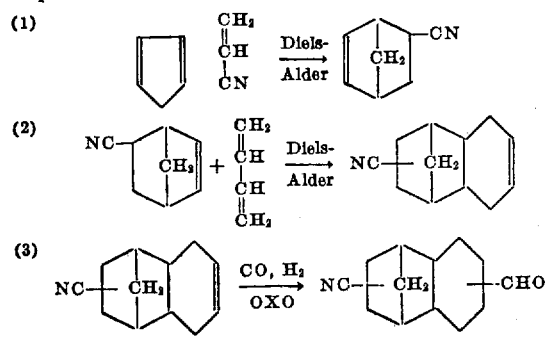

Additional illustrative compounds that are represented by Formula II include 5-methyltricyclo[6.2.1.0$^{2,7}$]undec-4,9(or 10)-ylenedimethylene diamine and diisocyanate (can be prepared from cyclopentadiene, acrylonitrile, and isoprene by a route analogous to that employed for producing compounds XVII and XVIII, above); 5-butyltricyclo[6.2.1.0$^{2,7}$]undec-4,9(or 10)-ylenedimethylene diamine and diisocyanate (can be prepared from cyclopentadiene, acrylonitrile, and 1,3-octadiene[2] by a route analogous to that employed for producing compounds XVII and XVIII, above); and many other diamines and diisocyanates. For instance, another highly useful triamine and triisocyanate that are represented by Formula II is decahydro-1,4 - methanonaphthalene - 2,3,6 - (or 7)-trimethylene triamine and triisocyanate that can be produced from fumaronitrile, cyclopentadiene, and butadiene by the following sequence of reactions:

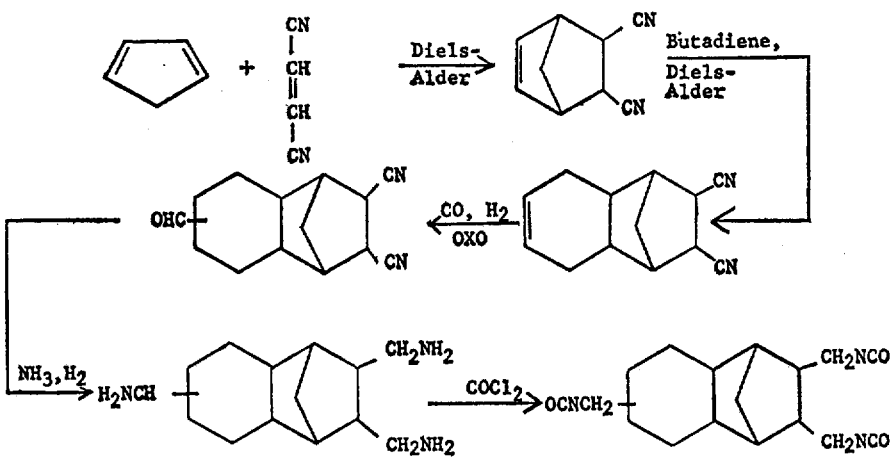

[2] Nazarov et al., C.A. 54, 245231 (1960).

Also useful are decahydro-1,4-methanonaphthalene-2,6(or 7)-dimethylene-2-ethylene diamine and diisocyanate. These compounds can be produced by employing itacononitrile in lieu of fumaronitrile in the process described immediately above. The formulas for these compounds are:

Still further polyamines and polyisocyanates that are within the scope of Formula I include tricyclo[6.2.2.0$^{2,7}$]dodec-4(or 5),9(or 10)-ylenedimethylene diamine and diisocyanate prepared from acrylonitrile, 1,3-cyclohexadiene, and butadiene by a route analogous to that employed to produce compounds (XVII) and (XVIII),

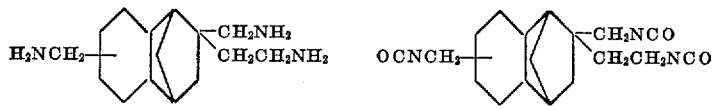

The polyamines and polyisocyanates that are represented by Formula II represent a preferred aspect of the polyamines and polyisocyanates that are within the scope of Formula I. There are, however, many additional valuable compounds that are represented by Formula I. Illustrative compounds include those described below.

Useful compounds within the scope of Formula I include hexahydro-4,7-methanoindan-1(or 2),5(or 6)-ylenediethylene diamine or diisocyanate. These compounds can be prepared by the following sequence of reactions:

above; 3-methyltricyclo[6.2.2.0$^{2,7}$]dodec-6,9(or 10)-ylenedimethylene diamine and diisocyanate prepared from acrylonitrile, 1,3-cyclohexadiene, and sorbaldehyde by a route analogous that employed for producing compounds (II) and (III), above; tricyclo[8.2.2.0$^{2,9}$]tetradec-5(or 6),11(or 12)-ylenedimethylene diamine and diisocyanate prepared from 1,3-cyclohexadiene and 1,4-cyclooctadiene by a route analogous to that employed to produce compounds (VI) and (VIII), above; 6-butyl [6.2.2.0$^{2,7}$]-dodec-4(or 5),9(or 10)-ylenedimethylene diamine and diisocyanate prepared from acrylonitrile, 1,3-

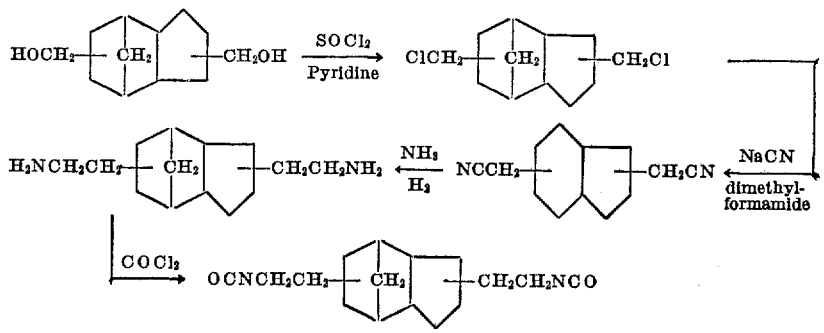

Tricyclo[4.2.2.0$^{2,5}$]dec-3,7(or 8)-ylenedimethylene diamine or diisocyanate are additional examples of compounds that are within the scope of Formula I. These compounds can be produced from 1,3-cyclohexadiene and 2,3-dichlorocyclobutene by the following sequence of reactions:

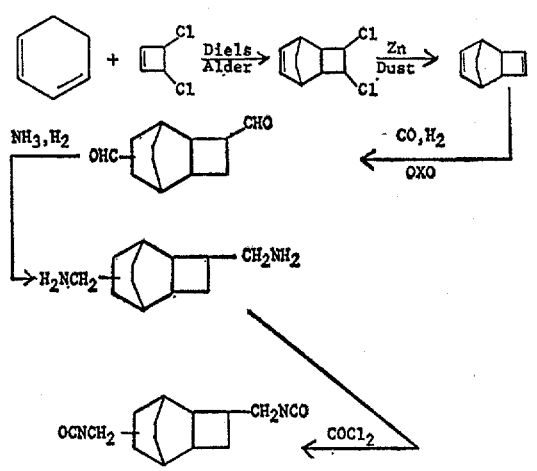

cyclohexadiene, and 1,3-octadiene by a route analogous to that employed to produce compounds (XVII) and (XVIII), above; and the like.

Also illustrative of the compounds that are within the scope of Formula I are the useful compounds that can be derived from furan and cyclopentadiene. For instance, a Diels-Alder reaction between furan and cyclopentadiene produces a mixture in accordance with the following:

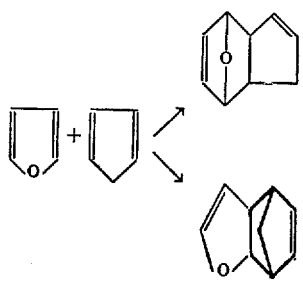

Subsequent hydroformylation, reductive amination, and phosgenation of these two compounds will produce 10- oxatricyclo[5.2.1.0^{5,9}]decan-2(or 3),7(or 8) - ylenedimethylene diamine and diisocyanate:

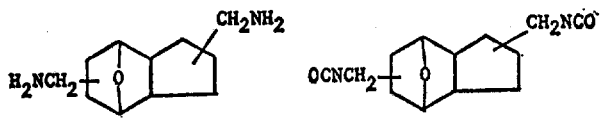

and 3-oxatricyclo[5.2.1.0^{5,9}]decan-2(or 3),7(or 8)-ylenedimethylene diamine and diisocyanate:

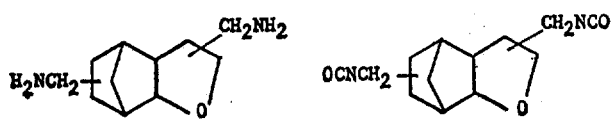

As additional examples of compounds that illustrate Formula I there can be mentioned 2(or 3)-(2-isocyanatoethoxy)decahydro - 1,4 - methanonaphthalen-6(or 7)-yl-methylene isocyanate and the corresponding diamine. These compounds can be prepared by the following sequence of reactions:

Formula I is also illustrated by decahydro-1,4-(dimethoxy)methanonaphthalen-2(or 3),6(or 7)-ylenedimethylenediamine and diisocyanate. These compounds, which can be prepared by a route analogous to that employed for compounds (XVII) and (XVIII), above, except that dimethoxycyclopentadiene is substituted for cyclopentadiene, are represented by the following formulas:

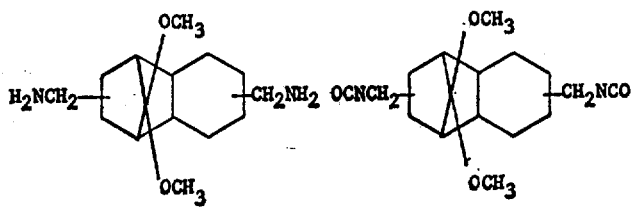

Additional compounds that are representative of Formula I include 2-methoxydecahydro-1,4-methanonaph-

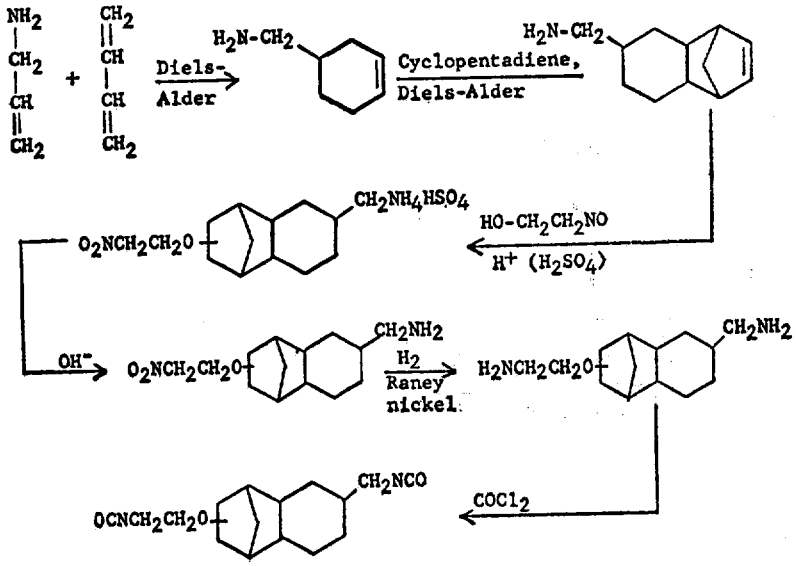

thalen-2(or 3),6(or 7)ylenedimethylene diamine and diisocyanate, and the like.

The compounds that are within the scope of Formua I can be further exemplified by 6(or 7)-aminomethyl-decahydro-1,4-methanonaphthalen-2(or 3) - yl 2-aminopropionate and 6(or 7)-isocyanatomethyl-decahydro-1,4-methanonaphthalen-2(or 3)-yl 2-isocyanatopropionate.

As further illustration of the compounds that are within the scope of Formula I there can be mentioned 2(or 3)-(3-aminopropoxy)-6-octyl-7-(9-isocyanatononyl) - decahydro-1,4-methanonaphthalene. These compounds can be produced from methyl oleate, butadiene, cyclopentadiene, and ethylenechlorohydrin by the following route:

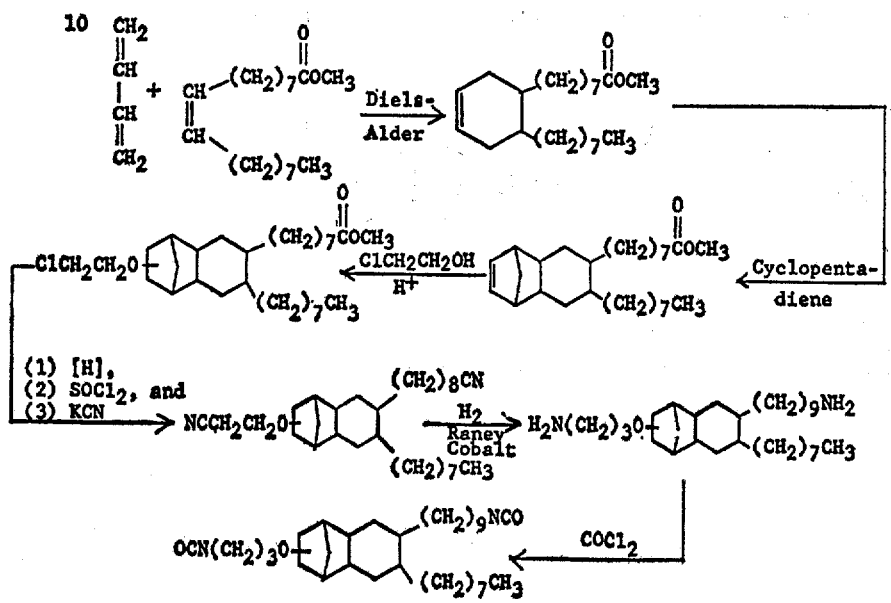

These compounds can be prepared by the following route:

Formula I can be still further illustrated by 6-ethoxydecahydro-1,4-methanonaphthalen - 2(or 3),7 - ylenedi-

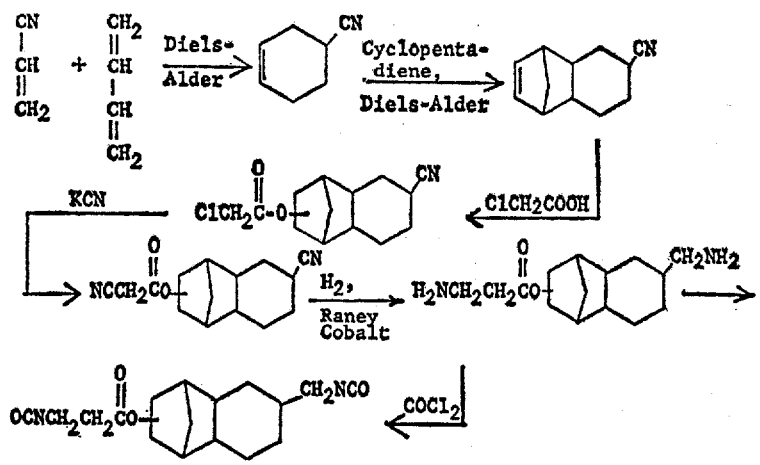

methylene diamine and diisocyanate. The compounds can be produced by the following sequence of reactions:

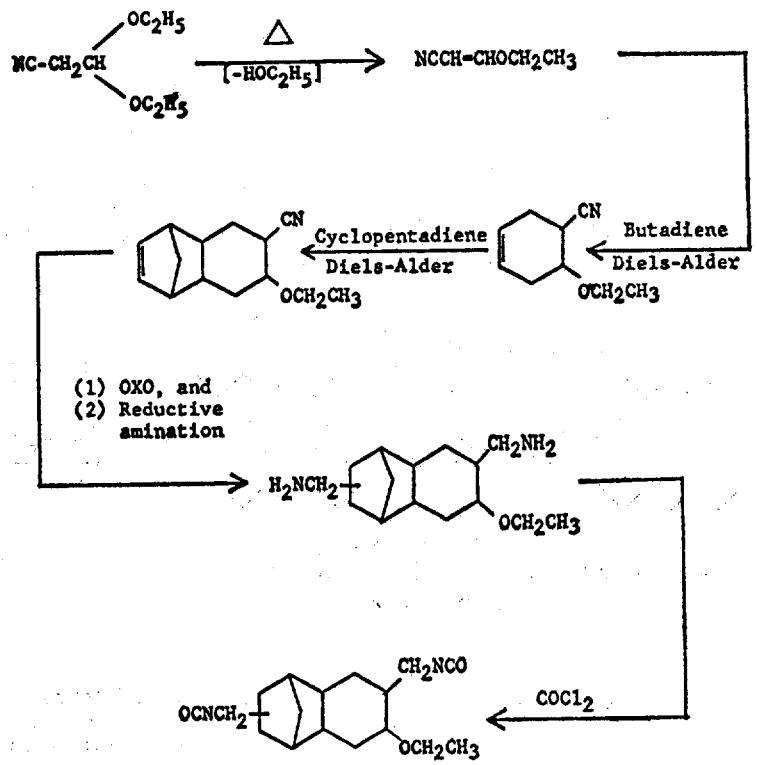

Referring now to Formulas I and II, it is seen that the variable G forms part of a four- to eight-sided ring and that G can contain an oxygen atom in the ring and G can also be substituted with alkyl, alkoxy, aminoalkyl, or isocyanatoalkyl wherein the various alkyl groups can contain up to 20 carbon atoms. Preferably, G will contain no more than three substituents other than the —RX variable, and more preferably, said substituents will contain a total of not more than 10 carbon atoms and, most preferably, a total of not more than 5 carbon atoms. In two preferred aspects of the invention, G is part of a 5-membered ring or a 6-membered ring. These aspects of the invention comprise derivatives of hexahydro-4,7-methanoindane and decahydro-1,4-methanonaphthalene, respectively.

A significant advantage of the diamines and diisocyanates that are within the scope of Formula I is that the amino groups and isocyanato groups thereof are bonded to the terminal carbon atom of an alkylene (or substituted alkylene) group, and are thereby free of steric hindrance which results in these compounds having enhanced reactivity.

The second class of tricyclic compositions that are within the scope of the invention are compounds that have three fused saturated hydrocarbon rings, the said rings having from 4 to 8 carbon atoms (at least one ring being a six-membered ring), and wherein the said compounds each contain at least two amino groups or at least two isocyanato groups. Specific illustrative examples of such tricyclic compounds are described below. Tetradecahydro- 9,10-anthrylene diamine and diisocyanate can be produced from anthracene by the following sequence of reactions:

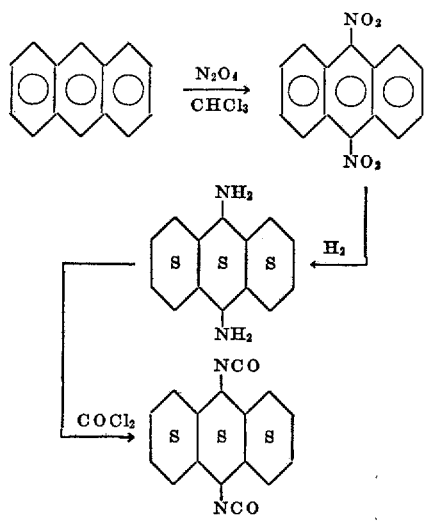

Tetradecahydro-2,6-(or 7)-anthrylenedimethylene diamine and diisocyanate can be prepared from 1,4,4a,5,8,8a, 9,9a,10,10a - decahydroanthracene [3] by the following sequence of reactions:

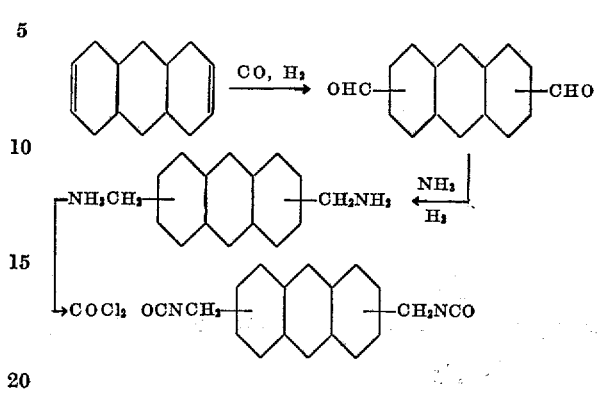

Tetradecahydro-2-methyl-2,6(or 7) - anthrylenedimethylene diamine and diisocyanate can be produced from isoprene and 1,4,4a,5,8,8a-hexahydronaphthalene by the following route:

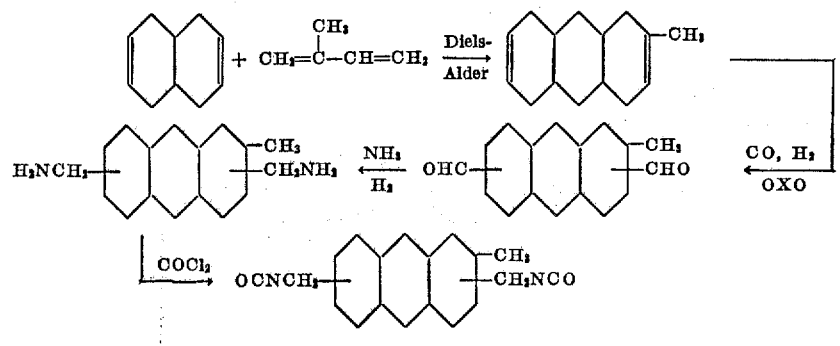

Tetradecahydro-2(or 3),5(or 6)-phenanthrylenedimethylene diamine and diisocyanate can be produced from butadiene and 1,2,4a,5,8,8a-hexahydronaphthalene by the following sequence of reactions:

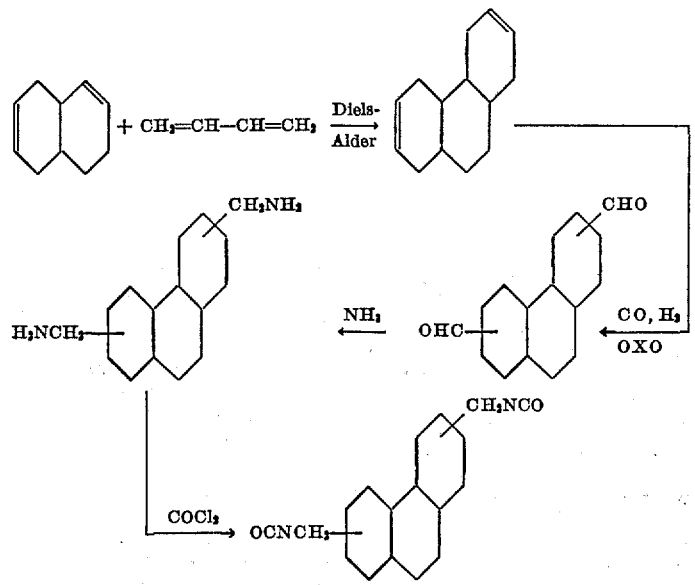

---

[3] Hill et al., J. Am. Chem. Soc., 83, 4006–12 (1961).

Hexadecahydrodibenzo[a,e]-cyclooctan-2,8(or 9)-ylene-dimethylene diamine and diisocyanate can be produced from butadiene and 1,5-cyclooctane by the following route:

A third class of tricyclic polyamines and polyisocyanates that are within the scope of the invention comprises the compositions having at least two amino or at least two isocyanato groups that are bonded to a saturated

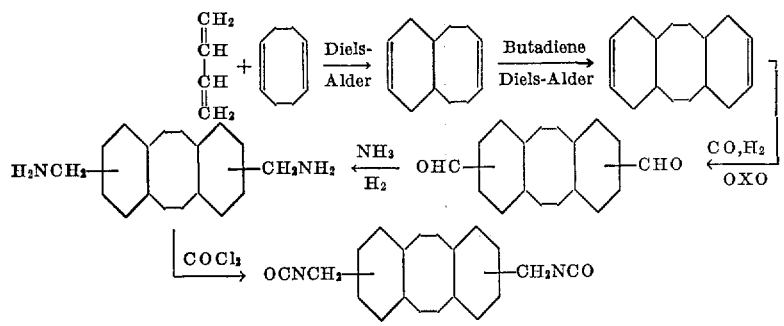

The foregoing illustrated class of diisocyanates and diamines are tricyclic compounds wherein the rings are four-eight-membered (at least one ring being six-membered), and wherein the isocyanato or amino groups are either bonded directly to the tricyclic structure or are bonded to methylene groups. The tricyclic structure can contain alkyl group substituents, preferably, wherein the alkyl has from 1 to 4 carbon atoms. These diisocyanates and diamines can be represented by Formula III:

(III)      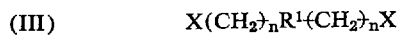
$X(CH_2)_n R^1 (CH_2)_n X$ wherein X is amino or isocyanato, wherein $n$ is zero or one, and wherein $R^1$ represents a divalent saturated substituted or unsubstituted hydrocarbon group having three fused rings, said rings individually having from 4 to 8 carbon atoms in each of the rings, provided that at least one ring is a six-membered ring.

organic group having three ring structures, at least one of said rings being bonded to another ring by a divalent organic group that can be alkylene, oxy, carbonyloxy, thio, sulfone, or alkylene substituted with any of oxy, carbonyloxy, thio, or sulfone. The following compounds are illustrative of this class of tricyclic composition:

2-aminobicyclo[2.2.1]hept-5(or 6)-yl,
2-aminocyclohexanecarboxylate and
2-isocyanatobicyclo[2.2.1]-hept-5(or 6)-yl
   2-isocyanatocyclohexanecarboxylate, which can be produced from 2-nitrobenzoic acid and 2-nitro-5-norbornene by the following route:

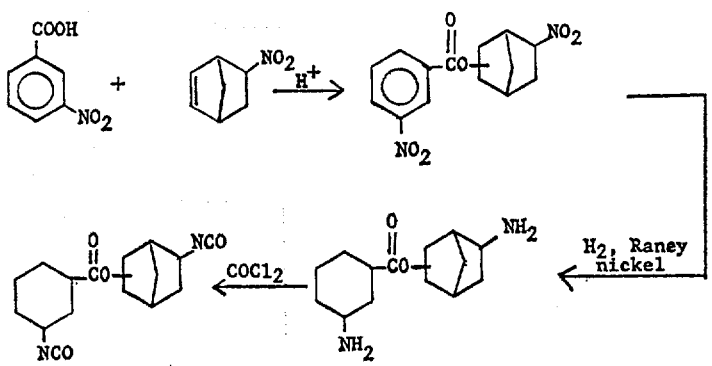

2-aminomethylbicyclo[2.2.1]hept-5(or 6)-yl
2-aminomethylcyclohexyl ether and
2-isocyanatobicyclo[2.2.1]-hept-5( or 6)-yl
2-isocyanatomethylcyclohexyl ether, which can be produced from epoxycyclohexane and 2-aminomethyl-5-norbornene by the following route:

2-(2-isocyanatoethyl)bicyclo[2.2.1]hept-5(or 6)-yl 2-isocyanatomethylcyclopentyl ether, which can be pro-

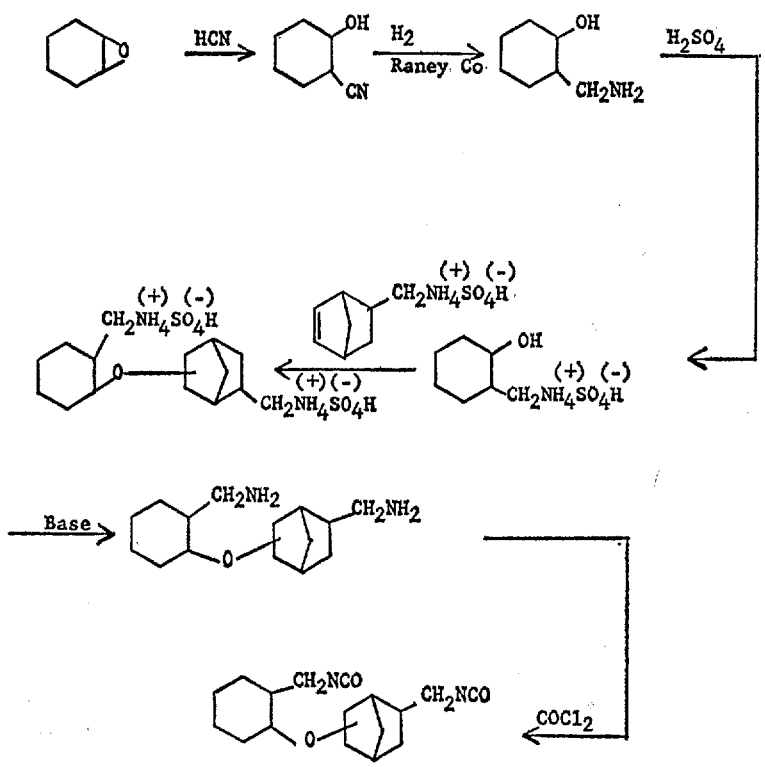

2-(2-aminoethyl)bicyclo[2.2.1]hept.5(or 6)-yl 2-aminomethylcyclopentyl ether and duced by the following route from epoxycyclopentane and 2-chloromethyl-5-norbornene:

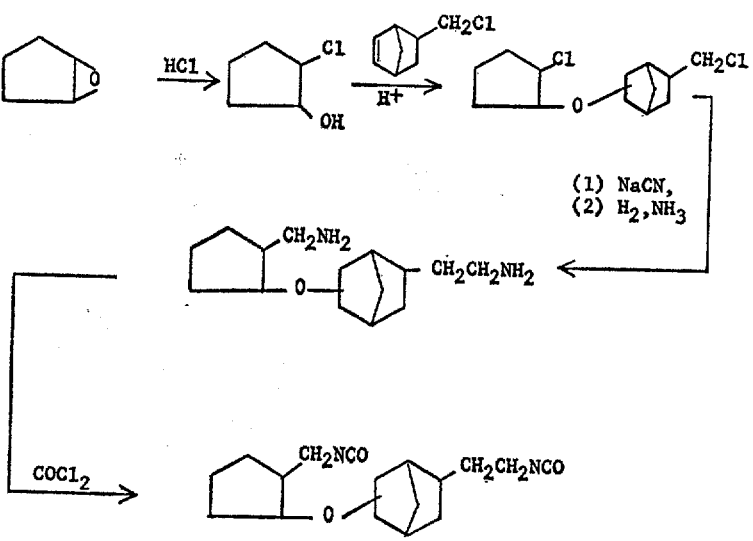

2-isocyanatobicyclo[2.2.1]hept-5(or 6)-yl 2-methyl-2-isocyanatocyclohexyl sulfone, which can be produced from divinyl sulfone, cyclopentadiene, and isoprene by the following route:

1 - (2 - aminocyclohexyl) - 2 - (5(or 6) - aminomethyl-norbornyl)ethane and 1-(2-isocyanatocyclohexyl)-2-(5 (or 6) - isocyanatomethylnorbornyl)ethane, which can be produced by the following sequence of reactions:

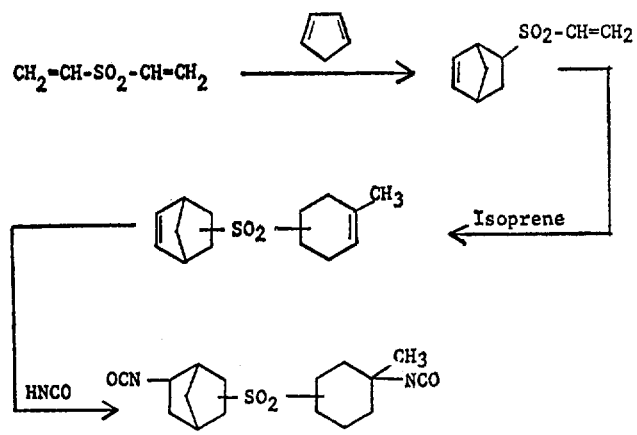

1(or 2)-isocyanato-2(or 1)-iodohexahydroindan-5(or 6)-yl

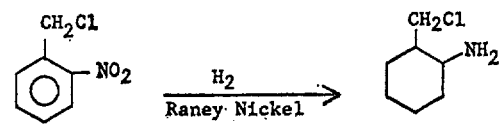

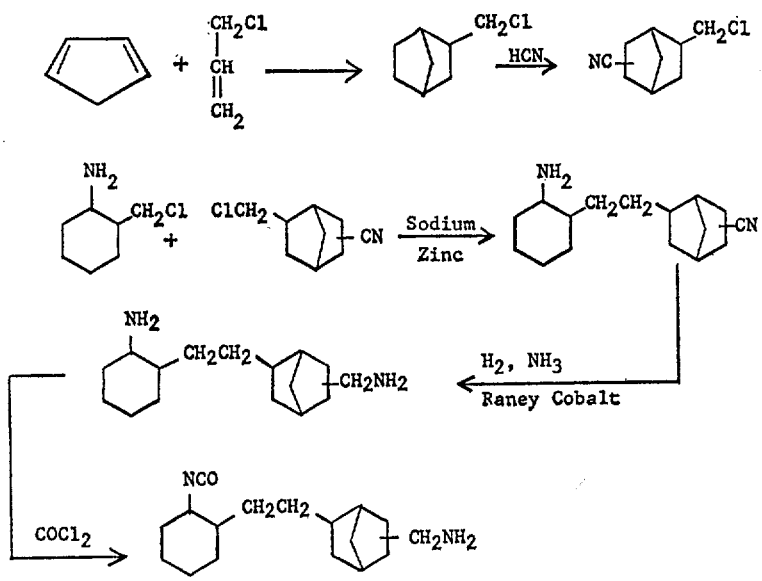

2-iodo-3-isocyanatocyclohexyl thioether, which can be produced by the following sequence of reactions:

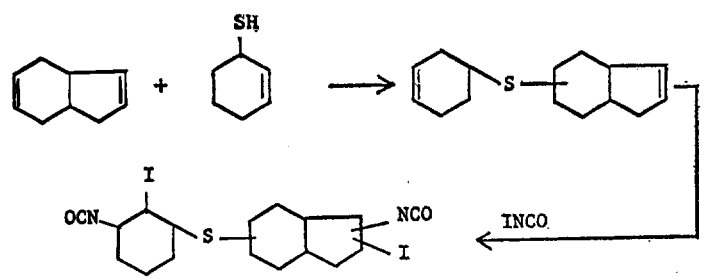

1,4 - cyclohexanediol bis(2 - aminomethylcyclohexanecarboxylate) and 1,4-cyclohexanediol bis(2-isocyanatomethylcyclohexanecarboxylate), which can be produced from 2-chlorobenzoic acid and 1,4-cyclohexanediol by the following route:

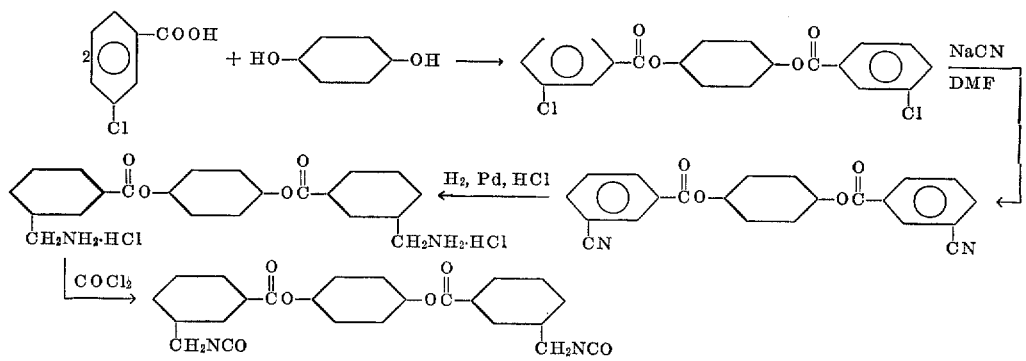

One preferred group of compounds that are within the above exemplified third class of tricyclic compositions are those that are represented by Formula IV:

IV
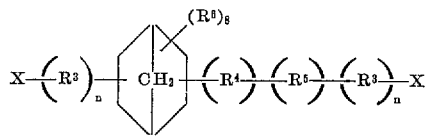

wherein X represents amino or isocyanato, wherein each $R^3$ individually represents alkylene of up to 4 carbon atoms, wherein each $n$ individually is zero or one, wherein $R^4$ represents carbonyloxy, oxy, thio, sulfonyl, or alkylene of up to 4 carbons, wherein $R^5$ represents either cyclopentylene or cyclohexylene, and wherein $R^6$ represents hydrogen, alkyl, alkoxy, aminoalkyl, isocyanatoalkyl, or halo.

The foregoing discussion has described illustrative methods for preparing the useful tricyclic compositions of the invention. Many more compounds than those that have been enumerated are within the scope of the invention. Such compounds can be prepared by one or more procedures that are analogous to the procedures that have been described.

There is a wide variety of compositions within the scope of the invention. For instance, with respect to Formula I

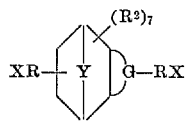

there are many substituted and unsubstituted polyamines and polyisocyanates that are contemplated by the invention. The variable $R^2$ can be any of several substituent groups and the variables R, Y, and G can contain substituent groups. The total number of carbon atoms contained in the several substituent groups will rarely exceed twenty, and is preferably not more than ten. The same is true for the compositions that are represented by Formulas II, III, and IV. In a preferred aspect, the invention relates to diamines and to diisocyanates, although higher polyamines and polyisocyanates are included within the scope of the invention. For instance, the tricyclic compounds of the invention can have up to four or more amino or isocyanato groups. In the several formulas that represent various aspects of the invention, the variable X can be either isocyanato or amino and the tricyclic composition can also contain other isocyanato or amino groups. Of course, when X is isocyanato the tricyclic composition will not contain amino substituents, and when X is amino the tricyclic composition will not contain isocyanato substituents.

The novel polyamines of the invention are widely useful compositions. For instance, the polyamines can be employed in the production of many types of polymers. The polyamines, especially the diamines, can be reacted with isocyanato-terminated polyurethanes (i.e., polyurethane "prepolymers") to form polyurethane-polyurea elastomers and spandex fibers. The novel polyamines, preferably the diamines, can be reacted with dicarboxylic acids to produce useful polyamides. The polyamines can be reacted with alkylene oxides such as ethylene oxide, propylene oxide, or butylene oxide to form polyols useful in producing urethane polymers, surface coatings, and the like. Similarly, the polyamines can be reacted with lactones such as epsilon-caprolactone or with mixtures of lactones and alkylene oxides to form useful polyols. The polyamines are also widely useful as reaction intermediates for syntheses of useful compounds by known reactions that involve amines.

The novel polyisocyanates of the invention are also widely useful compositions. For instance, the polyisocyanates can be employed to produce useful compositions by reacting with compounds that have at least one reactive hydrogen as determined according to the Zerewitinoff test described by Wohler in the Journal of the American Chemical Society, volume 48, page 3181 (1927). Illustrative classes of compounds which contain at least one active hydrogen include, for instance, alcohols, amines, carboxylic acids, phenols, ureas, urethanes, hydrazines, water, ammonia, hydrogen sulfide, imines, thioureas, sulfimides, amides, thiols, amino alcohols, sulfonamides, hydrazones, semi-carbazones, oximes, hydroxycarboxylic acids, aminocarboxylic acids, vinyl polymers which contain a plurality of pendant active hydrogen substituents such as hydroxyl, carboxyl, or amino, and the like. In addition, the hydrogen substituent may be activated by proximity to a carbonyl group. The polyisocyanates are particularly useful in the production of polymeric products. For instance, they can be reacted with polyhydric alcohols to form urethane polymers, with polyamines to form polyureas, with polycarboxylic acids to form polyamides, with water to form polyureas, with polymercaptans to form polythiolurethanes, with ureas to form polybiurets, and the like. The polyisocyanates can be polymerized to form isocyanate homopolymers by treating with suitable catalysts such as tributyl phosphine. The polyisocyanates can also be reacted with alcohols to form carbamates that have biological activity.

In another major aspect, the invention relates to useful urethane polymers that are produced by reacting the polyisocyanates of the invention with one or more polyols. The polyols that can be employed for this purpose include, for instance, one or more polyols from the following classes of compositions:

(a) Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphonic acid, polyphosphoric acids, such as tripolyphosphoric acid and tetrapolyphosphoric acid, phenol-aniline-formaldehyde ternary condensation products, aniline-formaldehyde condensation products, phenol-alkanolamine-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acid such as those prepared from an excess of ethylene glycol, propylene glycol, 1,1,1-trimethylolpropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

(d) Phosphorus-containing derivatives such as tris (dipropylene) glycol phosphite and other phosphites are useful in urethane foams.

The foregoing are merely illustrative of the many polyols that can be employed in the invention.

The polyol or polyol mixture employed can have hydroxyl numbers which vary over a wide range. In general, the hydroxyl numbers of the polyols employed in the invention can range from about 20, and lower, to about 800, and higher, preferably, from about 30 to about 750, and more preferable, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where:

OH=hydroxyl number of the polyol
$f$=average functionality, that is average number of hydroxyl groups per molecule of polyol
M.W.=average molecular weight of the polyol.

The exact polyol employed depends upon the end-use of the urethane product. For example, when used to prepare foams, the molecular weight and the hydroxyl number are selected properly to result in flexible, semi-flexible, or rigid foams. The polyol preferably possesses a hydroxyl number of from about 200 to about 800 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

In some cases, it may be desired to employ one or more additional organic polyisocyanates in addition to the polyisocyanates of the invention in the production of urethane polymers. Such additional isocyanates include one or more of the following compositions:

2,4-tolylene diisocyanate, 2,6-tolylene diisocyanate, crude tolylene diisocyanate, bis(4-isocyanatophenyl)methane, polyphenylmethylene polyisocyanates that are produced by phosgenation of aniline-formaldehyde condensation products, dianisidine diisocyanate, tolidine diisocyanate, xylylene diisocyanate, naphthalene diisocyanate, hexamethylene diisocyanate, bis(2-isocyanatoethyl) fumarate, bis(2-isocyanatoethyl) carbonate, and many other organic polyisocyanates that are known in the art, such as those that are disclosed in the article by Siefken, Ann., 562, 75 (1949).

The urethane polymers of the invention can take the form of foamed products, elastomers, fibers, surface coatings, castings, adhesives, and the like. The foamed products can be produced, for example, by the one-shot technique wherein all of the reactants are reacted simultaneously with the foaming operation. Also, the quasi-prepolymer technique can be used to produce foams. In this technique, the isocyanate is first reacted with a portion of the polyol to give a product having a high percentage of free-NCO groups (e.g., from 20 to 50 percent), and this product is subsequently foamed by reaction with polyol and foaming agent. In producing elastomers and castings, the prepolymer technique is useful. In the prepolymer technique, the isocyanate is reacted with a slightly less than stoichiometric quantity of polyol to produce a prepolymer having a low percentage (e.g., from 1 to 10 percent) of free —NCO groups. The prepolymer is subsequently converted into an elastomer by reacting with a cross-linking agent having reactive hydrogen atoms such as a diamine, for instance, a bis(aminochlorophenyl) methane. In producing surface coatings, there are several types of known reaction techniques which can be employed. The following are representative.

(1) Use of a prepolymer having a low percentage of free —NCO that is cured by atmospheric moisture;

(2) A two-component system in which a prepolymer is mixed with a polyol just before application;

(3) A one-package system comprising two ingredients and requiring a heat cure. One of the ingredients is a polyisocyanate prepolymer in which the free —NCO groups have been blocked (e.g., with phenol) to make the isocyanate groups non-reactive until unblocked by heat. The second ingredient is a polyol;

(4) A one-component system containing no free isocyanate. Unsaturated fatty acid diglycerides are reacted with polyisocyanate to cross-link the ester chains. Cure occurs through conventional oxidative drying of the fatty acid chains.

The amount of polyisocyanate employed will vary slightly depending upon the nature of the polyurethane being prepared. In general the total —NCO equivalent to total active hydrogen equivalent (i.e., hydroxyl plus water, if water is present) should be such as to provide a ratio of about 0.9 to 1.2 equivalents of —NCO per equivalent of active hydrogen, and preferably a ratio of about 1.0 to 1.1 equivalents of —NCO per reactive hydrogen.

When foams are being produced, foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are water and certain halogen-substituted aliphatic hydrocarbon which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1 - dichloro-1-fluoroethane, 1,1 - difluoro - 1,2,2 - trichloroethane, chloropentafluoroethane, 1 - chloro - 1 - fluoroethane, 1-chloro-2-fluoroethane, 1,1,2-trichloro-1,2,2-trifluoroethane, 2-chloro-1,1,1,2,3,3,4,4,4 - nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating such as N,N′-dimethyl-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respetcively.

Catalysts can be employed in the reaction mixture for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N-ethylmorpholine, N,N,N',N'-tetramethyl-1,3-butanediamine, N,N - dimethylethanolamine, 1,4 - diazabicyclo[2.2.2]octane, bis [2-N,N-dimethylamino)ethyl]ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate (in making flexible foams) or dibutyltin dilaurate (in making rigid foams). The catalyst is employed in catalytic amounts such as from about 0.05 weight percent to about 6 weight percent, based on weight of polyol.

When producing urethane foams, it is useful in many cases to employ a surfactant which serves as a stabilizer in making flexible foams and as a cell size regulator in making rigid foams. Polysiloxane-polyoxyalkylene block copolymers are useful surfactants for this purpose. Among the polysiloxane-polyoxyalkylene block copolymers that are useful are those that are disclosed in U.S. Patents 2,-834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frisch, "Polyurethanes: Chemistry and Technology," Interscience Publishers, New York. Part I, "Chemistry," was published in 1963 and Part II, "Technology," in 1964.

The urethane polymers of the invention have wide utility that is enhanced in many cases because the aliphatic isocyanates of the invention are much less susceptible to discoloration upon exposure to light than are the aromatic isocyanates which are used in the industry at this time. The urethane polymers of the invention can be employed as elastomers, rigid and flexible foams, coatings, and the like. The wide utility as gaskets, sealers, in insulation, cushions and padding, in paints and varnishes, and the like, of urethane polymers is well known.

In still another major aspect, the invention relates to polymers produced by reacting the diamines of the invention with polyepoxides. Many polyepoxides can be employed for this purpose. One preferred class of polyepoxides are the glycidyl ethers. These include the diglycidyl diether of 2,2-bis(4-hydroxyphenyl)propane, the diglycidyl diether of bis(4-hydroxyphenyl)methane, diglycidyl ether, bis(2,3-epoxycyclopentyl)ether, and many others such as the condensation products of epichlorohydrin and 2,2-bis(4-hydroxyphenyl)propane.

Additional polyepoxides that are useful in the invention include those that are represented by Formula IV:

IV 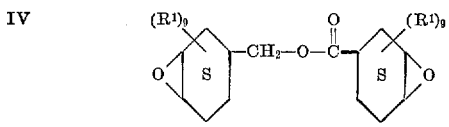

wherein each $R^1$ individually represents hydrogen or alkyl, preferably lower alkyl of from 1 to 4 carbon atoms. The preparation of these diepoxides is found in U.S. Patent No. 2,716,123. Among the diepoxides that are represented by Formula IV that deserve particular mention are the following compositions: 3,4-epoxycyclohexylmethyl 3,4-epoxycyclohexanecarboxylate; 3,4-epoxy-1-methylcyclohexylmethyl 3,4-epoxy-1-methylcyclohexanecarboxylate; 3,4-epoxy-6-methylcyclohexylmethyl 3,4-epoxy-6-methylcyclohexanecarboxylate; and the like.

A second class of polyepoxides that are useful in the invention are those diepoxides that are represented by Formula V:

V 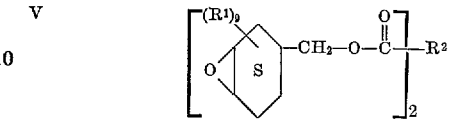

wherein each $R^1$ individually represents hydrogen or alkyl, preferably lower alkyl of from 1 to 4 carbon atoms, and wherein $R^2$ represents a divalent hydrocarbon group of from 0 to 10 carbon atoms. The preparation of the diepoxides that are represented by Formula V is found in U.S. Patent Nos. 2,750,395 and 2,863,881. Among the diepoxides that are represented by Formula V that deserve particular mention are the following compositions: bis(3,4-epoxy-6-methylcyclohexylmethyl) adipate; bis (3,4-epoxycyclohexylmethyl) adipate; bis(3,4-epoxycyclohexylmethyl) oxalate; bis(3,4-epoxycyclohexylmethyl) succinate; bis(3,4-epoxy-6-methylcyclohexylmethyl) sebaate; bis(3,4-methyl) maleate; bis(3,4-epoxycyclohexylmethyl) terephthalate; and the like.

Another useful class of polyepoxides are those that are represented by Formula VI:

VI 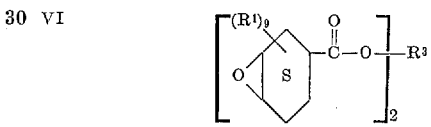

wherein $n$ is an integer having a value in the range of from 2 to 4, wherein each $R^1$ individually represents hydrogen or alkyl, preferably lower alkyl of from 1 to 4 carbon atoms, and wherein $R^3$ represents a saturated aliphatic group having a valence of $n$. The preparation of the polyepoxides that are represented by Formula VI is known, for example, see U.S. Patent Nos. 2,745,847 and 2,884,408. Representative epoxides that are within the scope of Formula IV are the following compositions: ethylene glycol bis(3,4-epoxycyclohexanecarboxylate); diethylene glycol bis(3,4-epoxy-6-methylcyclohexanecarboxylate); glycerol tris(3,4-epoxycyclohexanecarboxylcate; bis(3,4-methyl) maleate; bis(3,4-epoxycyclohexylboxylate); and the like.

A further class of polyepoxides that are useful in the invention are those that are represented by Formula VII:

VII 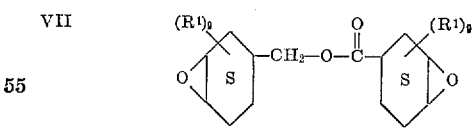

wherein each $R^1$ individually represents hydrogen, alkyl, preferably lower alkyl of from 1 to 4 carbon atoms, or halogen, preferably chloro, bromo, or iodo, provided that at least one $R^1$ is halogen. The preparation of the diepoxides that are represented by Formula VII is disclosed in U.S. Patent No. 2,874,167. Among the diepoxides that are represented by Formula VII that deserve particular mention are (1-bromo-3,4-epoxy-cyclohexane-1-yl)methyl 1-bromo-3,4-epoxycyclohexanecarboxylate, and the like.

The epoxy-based polymers of the invention are produced by reacting one or more of the diamines of the invention with one or more polyepoxides. The general procedures employed for producing such epoxy-based polymers are well known in the art. For instance, the texts by Skeist (Epoxy Resins, Reinhold Publishing Corporation, New York, N.Y.—published in 1958) and by Lee and Neville (Epoxy Resins, McGraw-Hill Book Company, Inc., New York, N.Y.—published in 1957) are useful for describing epoxy resin technology.

The epoxy resins of the invention have wide utility in the preparation of case and molded articles, in surface coatings, in laminates and other reinforced compositions, and the like.

The examples which follow illustrate certain aspects of the invention.

EXAMPLE 1

Production of decahydro-8-methyl-1,4-methanonaphthalen-2(or 3),5-ylenedimethylene diamine (II) and diisocyanate (III)

(A) 2(or 3)-cyano-1,2,3,4,4a,5,8,8a-octahydro-8-methyl-1,4-methanonaphthalene - 5 - carboxaldehyde (I).—5-norbornene-2-carbonitrile, 357 g. (3 moles), 2,4-hexadienal 96 g. (1 mol) and 3 g. of hydroquinone were mixed together and heated at 140° for 9 hours. Fractional distillation of the reaction mixture under reduced pressure gave 110 g. of colorless liquid product (I), B.P., 132–140° (0.2 mm.) corresponding to a yield of 49.3 percent and an efficiency of 67 percent based on 2,4-hexadienal and an efficiency of 92 percent based on 5-norbornene-2-carbonitrile. The infrared spectrum was consistent with the assigned structure.

(B) Decahydro-8-methyl-1,4 - methanonaphthalen - 2 (or 3),5-ylenedimethylene diamine (II).—2(or 3)-cyano-1,2,3,4,4a,5,8,8a - octahydro-8-methyl-1,4 - methanonaphthalene-5-carboxaldehyde (I). 74.0 g. (0.34 mole) in 250 ml. of ethanol, 3 g. Raney nickel and ammonia 25 g. (1.45 moles) were charged to a stainless steel Adkins hydrogenator. The reductive amination was carried out at a hydrogen pressure of 2000 p.s.i. and at a temperature of 125° over an 8-hour period. The reaction mixture was filtered free of Raney nickel. Distillation of the filtrate under reduced pressure gave 51 g. of a colorless liquid product (II) B.P., 132–135° (0.7 mm.) corresponding to a yield and efficiency of 67 percent. The infrared spectrum was consistent with the proposed structure.

*Analysis.*—Calcd. for $C_{14}H_{26}N_2$: C, 75.61; H, 11.79; N, 12.6; equiv. wt., 11.18. Found: C, 75.91; H, 11.4; N, 12.33; equiv. wt. 112.8.

(C) Decahydro-8-methyl - 1,4-methanonaphthalen - 2 (or 3),5-ylenedimethylene diisocyanate (III).—To a solution of 80 g. of liquid phosgene in 300 g. of o-dichlorobenzene was introduced dropwise at 0° 25 g. of dechydro-8-methyl-1,4-methanonaphthalen-2(or 3) - ylenedimethylene diamine (II). Following completion of the feed period the temperature was allowed to rise slowly to 25°, at which point heat was applied and phosgene sparging was commenced. After 6.5 hours at 125°, hydrogen chloride evolution ceased and a clear solution was present. Removal of excess phosgene and solvent left 29 g. of a liquid residue which afforded, on evaporative distillation at 175°/.004 mm., 23.9 g. (87.2 percent) of an amber-colored oil, $n_D^{30}$, 1.5172. Further refining by vacuum distillation at .05 mm. provided 19.0 g. of an off-white, mobile liquid, B.P. 127°/0.05, $n_D^{30}$, 1.5169, with an indicated purity of 95.3 percent by isocyanate titration.

*Analysis.*—Calcd. for $C_{16}H_{22}N_2O_2$: C, 70.04; H, 8.08; N, 10.22. Found: C, 70.30; H, 7.65; N, 10.22.

EXAMPLE 2

(A) Hydroformylation of dicyclopentadiene.—A three-liter rocking autoclave was charged with 208 g. of distilled dicyclopentadiene, 0.6 g. of hexacarbonyldicobalt bis-(triphenyl phosphite) 0.5 g. of hydroquinone and 750 ml. of toluene. The vessel was sealed and charged, at 10° C., with 1400 p.s.i. CO and 1200 p.s.i. $H_2$. While rocking, the autoclave was heated to 150° C. and held at that temperature for 1 hr. 15 min. At the end of this period of time the gas absorption had ceased.

After cooling to room temperature, the excess gases were vented and the vessel was opened. The red liquid contents were divided into three equal parts. One part was stripped of solvent at reduced pressure.

(B) Reductive amination of hydroformylation product.—The residue obtained above was diluted with 225 ml. of absolute ethanol. A three-liter autoclave was charged with this solution and 20 g. of Raney nickel wet with ethanol. The vessel was sealed and charged with 110 g. of anhydrous ammonia by gaseous transfer. It was then pressurized with 2700 p.s.i. of hydrogen. The vessel and contents were heated, with rocking, at 85° C. for ten hours.

After cooling to room temperature, the excess gases were vented and the vessel was opened. The contents were filtered and the filtrate stripped of solvent. The oily residue was distilled through a 40-platen spinning band column. The diamine (41% yield, based on dicyclopentadiene) distilled at 114–120° C. at ~0.1 mm. Hg. Analysis of this diamine indicated a purity of 95.7%, calculated as a di(aminomethyl) dicyclopentadiene, i.e., hexahydro-4,7-methanoindan-1(or 2),5(or 6)-bis(methylamine).

(C) Preparation of hexahydro-4,7-methanoindan-1(or 2),5(or 6)-ylenedimethylene diisocyanate.—Hexahydro-4,7-methanoindan-1(or 2), - 5(or 6) - bis(methylamine) (140 g. 96.2% purity) was dissolved in o-dichlorobenzene (900 ml.), and dry carbon dioxide passed through the solution until no more was absorbed. The neutralization reaction is exothermic and occasional cooling in Dry Ice/ acetone was necessary to maintain the mixture at room temperature. The resulting white slurry was added dropwise to a solution of an excess of phosgene (415 g.) in o-dichlorobenzene (1 litre) at −10°. During the course of this addition (2 hrs.) the temperature was allowed to slowly rise to room temperature. Further phosgene was then passed through the slurry while the temperature was gradually raised. At about 90° most of the slurry had dissolved to give a clear solution with small amounts of suspended solid lumps remaining. It was necessary to continue the phosgenation at 140–145° for an additional 2 hrs. before all the solid dissolved to give a clear slightly yellow solution. Dry nitrogen was then passed through the solution for 5 hrs. at 140–160° until no further HCl was evolved. The solution considerably darkened during the degassing. Dichlorobenzene was stripped off at 40° under reduced pressure, and the remaining material distilled through a goose-neck head under vacuum. The following fractions were collected.

| Fraction | B.P.° | Pressure, mm. | Wt. in g. | $N_D^{20}$ | Purity | Percent hydrolyzable Cl |
|---|---|---|---|---|---|---|
| 1 | 25 | 0.35 | 6.5 | 1.5536 | 62.9 | 1.217 |
| 2 | 25–131 | 0.35 | 5 | 1.5209 | 98.4 | 0.251 |
| 3 | 121 | 0.35 | 9.5 | 1.5205 | 99.4 | 0.306 |
| 4 | 129–131 | 0.17–0.25 | 110.5 | 1.5204 | 97.4 | 0.747 |
| 5 | 131–136 | 0.15–0.17 | 34 | 1.5214 | | |
| Residue | | | 8 | | | |

Total yield of hexahydro-4,7-methanoindan-1(or 2),5(or 6)-ylenedimethylene diisocyanate=159 g. (90%).

*Analysis.* (fraction 4).—Calcd. for $C_{14}H_{18}N_2O_2$: C, 68.27; H, 7.37; N, 11.38. Found: C, 68.97; H, 7.43; N, 11.62; Cl, 2.02.

Fraction 4 was redistilled through a small (9″) glass packed column and after taking small heads and tails cuts there was obtained 83 g. of 1(or 2),5(or 6) bis(isocyanatomethyl)tetrahydro-4,7-methanoindane B.P. 126–127 at 0.15 mm., a water white liquid $N_D^{20}$ 1.5201. The purity of this material was 100.2% and the hydrolyzable chlorine content 0.109%.

*Analysis.*—Calcd. for $C_{14}H_{18}N_2O_2$: C, 68.60; H, 7.37; N, 11.38. Found: C, 68.52; H, 7.45; N, 11.38; Cl, 0.93.

EXAMPLE 3

(A) 1(or 2),5(or 6) - bis(chloromethyl) - hexahydro-4,7-methanoindan.—To a 500 ml., 4 necked glass kettle equipped with a stirrer, condenser, thermometer and graduated feed tank was charged a mixture of 116.5 g. of 1(or 2),5(or 6) - bis - hydroxy - methyl) - hexahydro-4,7-methanoindan and 7.5 ml. of pyridine. At a temperature of 10–25° C., thionyl chloride (277 g.) was added dropwise over a period of 2½ hours, during which time hydrogen chloride evolution was vigorous. Upon completion of the feed period (about 2½ hours), the charge was stirred for an additional hour at room temperature and then heated at reflux for 3 hours to complete the reaction. The charge was subsequently cooled to about 10° C. and decomposed carefully by the gradual addition of a large excess of ice water. The resulting two phase system was separated and the organic layer was diluted with ether. The ethereal solution was neutralized with 10% aqueous potassium carbonate, washed twice with water and dried over anhydrous sodium sulfate. Evaporation of the ether followed by distillation of the product through a Vigreaux column afforded 115 g. (83 percent) of a light yellow liquid boiling from 125–131° C. at 0.8–1.0 mm. Hg pressure. Redistillation through a spinning band column gave an analytical sample, B.P. 108°/0.35 mm., which was colorless and odorless.

$C_{12}H_{18}Cl_2$ requires: C, 61.8; H, 7.8; Cl, 30.5. Found: C, 62.4; H, 7.8; Cl, 30.0.

The infrared spectrum (neat) was in agreement with the proposed structure, displaying bands assignable only to C—H and/or C—Cl absorption.

(B) 1(or 2),5(or 6)-bis(cyanomethyl)-hexahydro-4,7-methanoindan.—To a 500 ml. glass kettle equipped with a stirrer, thermometer, feed tank and condenser was charged a mixture of 65 g. sodium cyanide and 200 ml. of N,N-dimethylformamide. At a temperature of 125° C., 150 g. of 1(or 2),5(or 6)-bis(chloromethyl)-hexahydro-4,7-methanoindan was introduced dropwise over a period of 1 hour, during which time sodium chloride precipitated out of the reaction mixture. After an additional two hours at 125° C., the charge was filtered to remove sodium chloride and the filter cake was washed with 200 ml. of methylene chloride. The yield of by-product sodium chloride was quantitative. After removal of solvents, 117 g. (85.0 percent) of the dinitrile was obtained as an almost colorless, mobile liquid boiling from 162–191° C. at 0.7–1.2 mm. Hg pressure. Redistillation through a spinning band column afforded an analytical sample of colorless, odorless material, B.P. 157–159°/0.13, $n_D^{20}$, 1.5089.

$C_{14}H_{18}N_2$ requires: C, 78.5; H, 8.5; N, 13.1. Found: C. 78.6; H, 8.5; N, 13.1.

The IR spectrum was consisted with the assigned structure, showing in addition to the expected C—H absorption, only a very intense C≡N band at 4.5µ (neat).

(C) 1(or 2),5(or 6)-bis(B-aminoethyl)-hexahydro-4,7-methanoindan.—To a 3-liter, stainless steel, stirred autoclave was charged a mixture of 240 ml. of isopropyl alcohol, 60 ml. of liquid ammonia, 4.0 g. of Raney nickel catalyst and 60 g. of 1(or 2),5(or 6)-bis(cyanomethyl)-hexahydro-4,7-methanoindan. The autoclave was heated to 100° C. and pressured up to 300 p.s.i.g. with hydrogen. At a pressure of 250–300 p.s.i.g., hydrogenation was continued until two successive 30 minute pressure readings indicated no further drop; the total pressure drop observed was 160 pounds. The charge was vented to the atmosphere to allow excess ammonia to escape, filtered to remove catalyst and stripped free of isopropanol. Vacuum distillation through a Vigreaux column afforded 48 g. (77 percent) of a colorless, mobile liquid with a pronounced ammoniacal odor, B.P. 118–126° C. at 0.1 mm. pressure. The product had an amine equivalent weight of 216 by titration with a standardized solution of 0.1 N HCl in aqueous methanol using a methyl red bromoeresol green mixed indicator; the theoretical equivalent weight is 222, thus indicating a purity of 87.2 percent. The infrared spectrum (neat) of the product was in good agreement with the assigned structure, being free of C≡N absorption and displaying, in addition to the expected C—H bands, hydrogen-bonded —NH₂ bands at 3.0, 3.1 and 6.26µ, and a strong, broad absorption at 12.0–12.3µ characteristic of primary amines.

(D) Hexahydro - 4,7 - methanoindan-1(or 2),5(or 6)-ylenediethylene diisocyanate.—In the manner described above in Example 1 a mixture of 400 cc. of o-dichlorobenzene and 150 g. of liquid phosgene was treated in a dropwise manner at −20° with 43 g. of hexahydro-4,7-methanoindan - 1(or 2),5(or 6) - ylenediethylenediamine. The temperature of the resulting suspension was permitted to rise gradually to 25°, heat was then applied, and phosgene sparging was commenced. Heating and phosgene sparging were continued at 150° until hydrogen chloride evolution ceased and a clear solution was obtained. Removal of excess phosgene followed by reduced pressure stripping of the solvent left a light brown liquid residue amount to 56 g. Purification of this residue by evaporative distillation followed by redistillation of the distillate (45 g., 84.9 percent) afforded a water-white, mobile liquid of B.P. 132–4/0.65 mm. Hg, $n/_D{}^{30}$, 1.5408.

*Analysis.*—Calc'd for $C_{16}H_{22}N_2O_2$: C, 70.04; H, 8.08; N, 10.22. Found: C, 70.33; H, 8.00; N, 10.33.

EXAMPLE 4

Decahydro-2,6,7-trimethyl-1,4-methanonaphthalen-2,6-(or 7)-ylenedimethylene diamine and diisocyanate Cyclopentadiene (1 mole, 66.1 grams), methacrylonitrile (3 moles, 201.3 grams), and 5 grams of hydroquinone are heated in refluxing toluene for 10 hours. Fractional distillation of the reaction mixture yields 2-methyl-2-cyano-5-norbornene in good yield.

A reaction mixture containing 2,3-dimethylbutadiene (1 mole, 82.14 grams), 2-methyl-2-cyano-5-norbornene (3 moles, 399.6 grams), and 5 grams of hydroquinone is heated at 140° C. for 8 hours. After this time, fractional distillation yields 2-cyano-2,6,7-trimethyl-1,2,3,4,4a,5,8,8a-octahydro-1,4-methanonaphthalene in good yield. This compound is reacted with hydrogen and carbon monoxide in a three-liter stirred autoclave. The pressure in the autoclave is 4000 p.s.i., the temperature is 165° C., the ratio of reactants is 1.2 moles of hydrogen to 1.3 moles of carbon monoxide to 1 mole of olefin, and the cobalt carbonyl catalyst is employed in quantities of about 0.3 weight percent, based on weight of reaction mixture. After 8 hours, 2-cyano - 6(or 7)-carboxaldehyde-2,6,7-trimethyl-decahydro-1,4-methanonaphthalene is produced in good yield.

One mole (233.34 grams) of 2-cyano-6(or 7)-carboxaldehyde - 2,6,7 - trimethyldecahydro - 1,4-methanonaphthalene, 1000 milliliters of ethanol, 12 grams of Raney nickel, 75 grams of ammonia are charged to a stainless steel hydrogenator. Reductive amination is carried out at a hydrogen pressure of 2000 p.s.i. and a temperature of 125 C. for 8 hours. The reaction mixture is then filtered and fractionally distilled to produce decahydro-2,6,7-trimethyl-1,4-methanonaphthalen - 2,6(or 7) - ylenedimethylene diamine in good yield. The infrared spectrum and elemental analysis are consistent with the assigned structure.

By a procedure analogous to that described in Example 1–C, 250.4 grams (1 mole) of the above described diamine is reacted with liquid phosgene in ortho-dichlorobenzene solvent. The product, decahydro-2,6,7-trimethyl-1,4-methanonaphthalen-2,6-(or 7)-ylenedimethylene diisocyanate is produced in good yield.

EXAMPLE 5

Tetradecahydro-2,6(or 7)-anthrylenedimethylene diamine and diisocyanate

By a procedure analogous to that described in Example 4, a hydroformylation reaction is conducted by reacting carbon monoxide, hydrogen, and 188.3 grams (1 mole) of 1,4,4a,5,8,8a,9,9a,10,10a - decahydroanthracene. The product, tetradecahydro-2,6(or 7)-anthrylene dicarboxaldehyde, is produced in excellent yield. This dialdehyde (248.4 grams, 1 mole) is then reacted with ammonia and hydrogen by a procedure analogous to that described in Example 1–B to produce tetradecahydro-2,6(or 7)-anthrylenedimethylene diamine. The infrared spectrum and the elemental analysis of the diamine are consistent with the assigned structure.

The above-described diamine (250.4 grams, 1 mole) is reacted with liquid phosgene in ortho-dichlorobenzene solvent by a procedure analogous to that described in Example 2–C to produce tetradecahydro-2,6(or 7)-anthrylenedimethylene diisocyanate in good yield. The infrared spectrum and the elemental analysis of the diisocyanate are consistent with the assigned structure.

EXAMPLE 6

Decahydro-1,4-methano-1H-benzocycloocten-2,6(7- or 8)-ylenedimethylene diamine and diisocyanate Decahydro-1,4-methano - 1H - benzocyclooctene-2,6-(7- or 8)-dicarboxaldehyde (234 grams, 1 mole) is reacted with 75 grams of ammonia and with hydrogen by a procedure analogous to that described in Example 2–B. The product, decahydro-1,4-methano - 1H - benzocyclooctene-2,6(7- or 8)-ylenedimethylene diamine, is recovered in good yield. The infrared spectrum and the elemental analysis is consistent with the assigned structure.

The diamine (236.4 grams, 1 mole) is converted to the corresponding diisocyanate by reacting it with carbon dioxide and then with phosgene by a procedure analogous to that described in Example 2–C. The infrared spectrum and the elemental analysis of the diisocyanate are consistent with the assigned structure.

EXAMPLE 7

Tricyclo[4.2.1.0$^{2,5}$]non-3,7(or 8)-ylenedimethylene diamine and diisocyanate Tricyclo[4.2.1.0$^{2,5}$]non - 3,7(or 8) - ylenedicarboxaldehyde (178 grams, 1 mole) is reacted with ammonia (75 grams) and hydrogen in the presence of 8 grams of Raney nickel catalyst by a procedure analogous to that described in Example 1–B. There is produced tricyclo[4.2.1.0$^{2,5}$]-non-3,7(or 8)-ylenedimethylene diamine in good yield. The infrared spectrum and the elemental analysis of the diamine are consistent with the assigned structure.

The diamine (180.3 grams, 1 mole) is then converted to the corresponding diisocyanate by a phosgenation reaction analogous to that described in Example 2–C. The product is produced in good yield and the elemental analysis is consistent with the assigned structure of tricyclo[4.2.1.0$^{2,5}$]non - 3,7(or 8)-ylenedimethylene diisocyanate.

EXAMPLE 8

Decahydro-1,4-methanonaphthalen-2,6(or 7)-ylenedimethylene diamine and diisocyanate One mole (203.3 grams) of 2-carbonitrile-decahydro-1,4-methanonaphthalene - 6(or 7) - carboxaldehyde is reacted with ammonia and hydrogen by a procedure analogous to that described in Example 1–B. The product, decahydro - 1,4 - methanonaphthalen - 2,6(or 7) - ylenedimethylene diamine, is produced in good yield. The infrared spectrum and the elemental analysis is consistent with the assigned molecular structure.

By a procedure analogous to that described in Example 2–C, the above-described diamine is converted to the diisocyanate by phosgenation. Excellent yields of the diisocyanate are obtained.

EXAMPLE 9

A spandex elastomer was produced from decahydro-8-methyl-1,4-methanonaphthalene - 2(or 3),5 - dimethylene diisocyanate (Example 1–C). The procedure was as follows:

The diisocyanate was reacted with a diol in the proportions shown in the table below to form a prepolymer. The prepolymer was then dissolved in N,N-dimethylformamide (DMF) and extended with a diamine. The extended polymer in a 12–13% solids solution was then cast into a film and cured at 80 C. for 16 hours in a forced air oven. The table below displays representative properties of the elastomers and identifies the various reactants.

TABLE.—SPANDEX ELASTOMERS

| | Prepolymer | | | Elastomer | | | | |
|---|---|---|---|---|---|---|---|---|
| Sample | Diol | NCO/OH | Reaction | Diamine | NH$_2$/NCO | Tensile strength, p.s.i. | Elong. Percent | Modulus 100%–300% |
| A | Diol A[1] | 2.2 | 1 hour at 85–90° C | MDA[3] | 0.8 | 3,950 | 800 | 160–405 |
| B | Diol B[2] | 3.0 | 1.75 hours at 80° C | EDA[4] | 0.7 | 4,250 | 560 | 340–1,080 |

[1] Reaction product of diethylene glycol and an 80/20 mixture of epsilon-caprolactone and methyl-epsilon-caprolactone to a molecular weight of 2,000
[2] Poly(tetramethyleneether)glycol, M.W. 1,000.
[3] 4,4'-methylenedianiline.
[4] Ethylenediamine.

By procedures analogous to that described above, useful spandex elastomers are prepared from hexahydro-4,7-methanoindan-1(or 2),5(or 6)-dimethylene diisocyanate, poly(epsilon-caprolactone) diol of 1000 molecular weight, and ethylenediamine, and from hexahydro-4,7-methanoindan - 1(or 2),5(or 6) - diethylene diisocyanate, polypropylene glycol of 1000 molecular weight, and 4,4'-methylene-bis(ortho-chloroaniline).

EXAMPLE 10

Several of the novel diamines of the invention were employed to harden an epoxy resin, the diglycidyl diether of 2,2-bis(4-hydroxyphenyl)propane. The diamine was employed with the diepoxide in proportions such that there was provided about one equivalent of amino hydrogen per equivalent of epoxy group. The amine/epoxy mixture was cured for 4 hours at 120° C. plus 2 hours at 160° C. Properties of the cured resins were as follows:

Epoxy resins

Diamine:                              Properties

Hexahydro - 4,7 - methanoindan-1(or 2),5(or 6)-dimethylene diamine -- HDT [1]—135° C.; tough resin.

1(or 2),5(or 6)-bis (3-aminopropyl)-hexahydro-4,7-methanoindane ----- HDT—110° C.; tough resin.

Decahydro - 8 - methyl - 1,4 - methanonaphthalene-2 (or 3),5-dimethylene diamine ----------------- HDT—141° C.; tough resin.

[1] Heat distortion temperature.

EXAMPLE 11

Oil modified polyurethane coatings

To 15.3 grams (0.5 equivalent) of glycerol is added 54.5 grams (0.193 equivalent) of soya acids and 50 grams of xylene. The stirred reaction mixture is heated under a nitrogen atmosphere and xylene is removed in a Dean-Stark trap until a temperature of 190°–200° C. is reached. The reaction solution is maintained at this temperature while water from the esterification reaction is removed as an azeotrope with the remaining xylene. Heating is continued for approximately five hours.

At the end of the heating period the reaction solution is cooled to 70–80° C. and 42.1 grams (0.307 equivalent) of decahydro - 8 - methyl - 1,4 - methanonaphthalen - 2 (or 3),5-ylenedimethylene diisocyanate is added dropwise over a period of 50 minutes. After the completion of the addition, the contents of the flask are stirred and heated at 85–90° C. for an additional six hours and 15 minutes. An analysis at the end of this period indicates that the isocyanate functional groups reacted. The reaction product is diluted to 50 percent solids and filtered. This varnish is applied to steel test panels and allowed to air dry. The resulting coatings have good hardness, impact resistance and adhesion to steel as determined by standard physical testing methods.

EXAMPLE 12

Moisture cured urethane coatings

Decahydro - 8 - methyl - 1,4 - methanonaphthalen - 2 (or 3),5-ylenedimethylene diisocyanate (27.4 grams; 0.1 mole) and the propylene oxide adduct of sucrose having a hydroxyl number of 481 (11.65 grams; 0.05 mole) are mixed and a drop of di-n-butyltin diacetate is added. The reaction temperature is maintained at about 65° C. by external cooling until the reaction subsides and then allowed to stand for one hour. A rubbery, solid product is formed whose infrared spectrum is in agreement with the proposed structure.

This product is dissolved in a 50:50 mixture (by volume) of toluene-acetone. The resulting solution contains 50 percent by weight of the polyisocyanate. A 5.0 mil film of the material is cast on a glass plate and allowed to react with the moisture in the air for about 24 hours at room temperature. The resultant film cures hard and clear.

EXAMPLE 13

Polyurethane castings

Decahydro - 8 - methyl - 1,4 - methanonaphthalen - 2, (or 3), 5-ylenedimethylene diisocyanate (11.1 grams, 0.10 equivalent) and the propylene oxide adduct of glycerol having a hydroxyl number of 633 (8.85 grams; 0.10 mole) are mixed well and dissolved gases are removed under reduced pressure. The solution is then poured into an aluminum dish and placed in a circulating air oven for 2 hours at 100° C.

The resulting casting is hard, and free of bubbles.

EXAMPLE 14

Spandex-type elastomer

Decahydro - 8 - methyl - 1,4 - methanonaphthalen - 2 (or 3),5-xylenedimethylene diisocyanate (36.214 grams, 0.132 mole) was placed in a flask along with 126.6 grams (0.06 mole) of a copolyester of ε-caprolactone methyl-ε-caprolactone (80/20 ratio) started with diethylene glycol and extended to a molecular weight of 2000 to give a polyol having an equivalent weight of 1055 as determined by the acetic anhydride-pyridine method for hydroxyl number. The ratio of isocyanato to hydroxyl groups in this mixture was 2.2/1. The mixture was heated at 85–90° C. for 1 hour and then poured into a wide-mouth jar and allowed to cool. The prepolymer had an equivalent weight of 1166 as determined by the standard amine analysis for isocyanate.

A spandex type elastomer was prepared by extending this quasi prepolymer (12 grams) in dimethylformamide (68 grams) solution with a sufficient amount of ethylene diamine (0.2473 gram) in a dimethylformamide (20 grams) to give a ratio of amine to isocyanate groups of 0.8 and a solids content of 12 percent. The diamine-DMF solution was added to the quasi-prepolymer solution at room temperature while stirring with the magnetic stirrer. After ten minutes the reaction mixture could be poured into Teflon molds and cured in the forced air oven for 16 hours at 80° C. to furnish elastic film, or used for the preparation of elastic fibers.

The resulting film has good elastomeric properties, e.g., 1600 p.s.i. tensile strength and 34% work recovery.

EXAMPLE 15

Polyurea from a tricyclic diisocyanate

In a 200 ml. three-necked flask which has been flushed with nitrogen and equipped with stirrer, dropping funnel, and condenser (the latter two protected with drying tubes) is placed a solution of 11.62 g. (0.10 mole) freshly distilled hexamethylenediamine in 39 ml. of distilled m-cresol. With stirring, 24.63 g. (0.10 mole) hexahydro-4,7-methanoindan-1 (or 2),5(or 6)-ylenedimethylene diisocyanate is added over a 10 min. period. The dropping funnel is washed with 10 ml. m-cresol and the temperature is raised to 218° C. for a period of 5 hr. The resulting viscous solution is permitted to cool and is poured into 1500 ml. methanol with vigorous stirring. The polymer which separates as a white solid, is filtered, washed several times by washing in a home-blender with ethanol and dried overnight at 60° C. in a vacuum oven.

EXAMPLE 16

Polyamide from decahydro-8-methyl-1,4-methanonaphthalen-2(or 3),5-ylenedimethylenediamine (A) Preparation of amine-adipic acid salt.—In a 250 ml. Erlenmeyer flask is placed 14.60 g. (90.100 mole) adipic acid. The acid is dissolved in 110 ml. absolute ethyl alcohol by warming, and then is cooled to room temperature. A solution of 22.68 g. (0.102 mole) decahydro-8-methyl-1,4-methanonaphthalen-2(or 3),5 - ylenedimethylenediamine in 20 ml. absolute ethyl alcohol is added quantitatively to the adipic acid solution. The mixing is accompanied by spontaneous warming. After standing overnight, the salt is filtered, washed with cold absolute alcohol, and air-dried to constant weights.

(B) Preparation of polyamide from adipic acid salt.—Twenty grams of the above prepared salt is charged into a polymer tube. The tube is purged with nitrogen, sealed, and heated at 215° C. for 2 hrs. The tube is allowed to cool to room temperature before it is opened.

A neck bearing a side arm is sealed onto the polymer tube, the tube is clamped in an upright position and the side arm connected to a trap. The trap is connected via a three-way stopcock, both to a vacuum pump and to a source of nitrogen. The top of the tube is fitted with a short section of rubber tubing. An inlet comprising a 7–8 mm. O.D. glass capillary tubing drawn out to a fine tip is fitted through the rubber tubing, with the end reaching the bottom of the polymer tube. The inlet is connected to a source of low pressure nitrogen.

The tube is purged of air by flushing with nitrogen. It is then heated to 270° C. After 30–60 min. heating at atmospheric pressure, the polymer is gradually brought to high vacuum by manipulating the three way stopcock. The heating is continued under vacuum of 0.2–1.5 mm. for about 1 hour. The polycondensation is discontinued when visual inspection of the rate of bubble rise indicates that the maximum melt viscosity has been reached.

Nitrogen is introduced through the stopcock, the inlet tube raised, and the tube allowed to cool. The tough, white, opaque polymer is removed by breaking the tube.

What is claimed is:
1. Tricyclic polyamines of the formula:

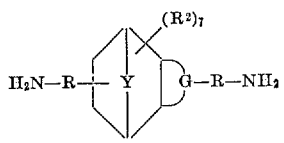

wherein Y represents methylene, ethylene, dimethoxymethylene, or oxy, wherein each R individually represents alkylene of up to 9 carbon atoms, oxyalkylene of up to 3 carbon atoms, or oxycarbonylalkylene of up to 3 carbon atoms, wherein $R^2$ represents hydrogen, methyl or aminoalkyl of up to 2 carbon atoms, and wherein G represents a saturated hydrocarbon group that can contain alkyl, or alkoxy substituents and which, together with the two carbon atoms to which the >G—R—$NH_2$ moiety is bonded, forms a cycloaliphatic ring having from 4 to 8 carbon atoms in the ring, provided that the total number of carbon atoms found in the said substituents in the said G variable does not exceed 10, and further provided that said tricyclic polyamine has not more than four amino groups.

2. The tricyclic polyamines of claim 1 wherein Y and the two R variables represent methylene groups.

3. The tricyclic polyamines of claim 1 wherein said tricyclic polyamines are hexahydro-4,7-methanoindanylenedialkylene diamines wherein the alkylylene groups each have from 1 to 2 carbon atoms.

4. Hexahydro-4,7-methanoindan-1(or 2),5(or 6)-ylenedimethylene diamine.

5. Hexahydro-4,7-methanoindan-1(or 2),5(or 6)-ylenediethylene diamine.

6. The tricyclic polyamines of claim 1 wherein said tricyclic polyamines are decahydro-1,4-methanonaphthalenylenedialkylene diamines wherein the alkylene groups each have from 1 to 2 carbon atoms.

7. Decahydro - 8-methyl-1,4-methanonaphthalen-2(or 3),5-ylenedimethylene diamine.

References Cited

UNITED STATES PATENTS

| | | | |
|---|---|---|---|
| 3,148,202 | 9/1964 | Cox et al. | 260—453 |
| 3,317,387 | 5/1967 | Prichard | 260—563 XR |

CHARLES B. PARKER, Primary Examiner

D. H. TORRENCE, Assistant Examiner

U.S. Cl. X.R.

260—2, 2.5, 47, 75, 77.5, 346.2, 348, 453, 464, 465, 468, 471, 482, 598, 607, 611, 644, 648, 666, 830, 999